United States Patent [19]

Daly

[11] Patent Number: 4,819,722

[45] Date of Patent: Apr. 11, 1989

[54] METAL WELL SCREEN ASSEMBLY WITH PLASTIC END FITTING AND METHOD OF ATTACHING SAME

[75] Inventor: Raymond A. Daly, Castletown, Ireland

[73] Assignee: Johnson Filtration Systems, Inc., New Brighton, Minn.

[21] Appl. No.: 145,310

[22] Filed: Jan. 19, 1988

[51] Int. Cl.$^4$ .................... B29C 27/08; E21B 43/08; F16L 47/02

[52] U.S. Cl. ................... 166/231; 156/73.5; 210/497.1; 264/248

[58] Field of Search ............ 166/227, 228, 230, 231, 166/242; 156/73.5; 210/497.1, 460; 264/248

[56] References Cited

U.S. PATENT DOCUMENTS

| | | | |
|---|---|---|---|
| 2,933,428 | 4/1960 | Mueller | 156/73.5 |
| 3,883,162 | 5/1975 | Colburn | 166/231 |
| 4,262,744 | 4/1981 | Mitchell et al. | 166/227 |
| 4,365,669 | 12/1982 | Wagner et al. | 166/231 |
| 4,428,423 | 1/1984 | Koehler et al. | 210/497.1 |

Primary Examiner—Stephen J. Novosad
Assistant Examiner—Terry Lee Melius
Attorney, Agent, or Firm—Barry L. Clark

[57] ABSTRACT

The invention relates to conventional metal well screens which have a screen wire wrapped about a plurality of internal support rods to define the screen slots, and particularly to a novel plastic end fitting made of a thermoplastic material which is mechanically attached to the well screen by means of a plurality of circumferentially spaced tongues which engage the inside surface of the screen wires and have a portion of their outer surface positioned within the screen slots. Slots formed in the end fitting between the tongue portions contain the support rods. A method of attaching a thermoplastic fitting made of a material such as polypropylene is also disclosed and includes the steps of heating the tongue portions so that a portion of their outer surface is melted and then is forced radially outwardly into the screen slots, and preferably slightly beyond them, by a pressure applying device such as a tapered wedge tooling arrangement. Induction heating of the screen wires can indirectly heat the plastic by conduction. However, the fitting attachment procedure may be speeded up by pre-heating the fitting.

15 Claims, 1 Drawing Sheet

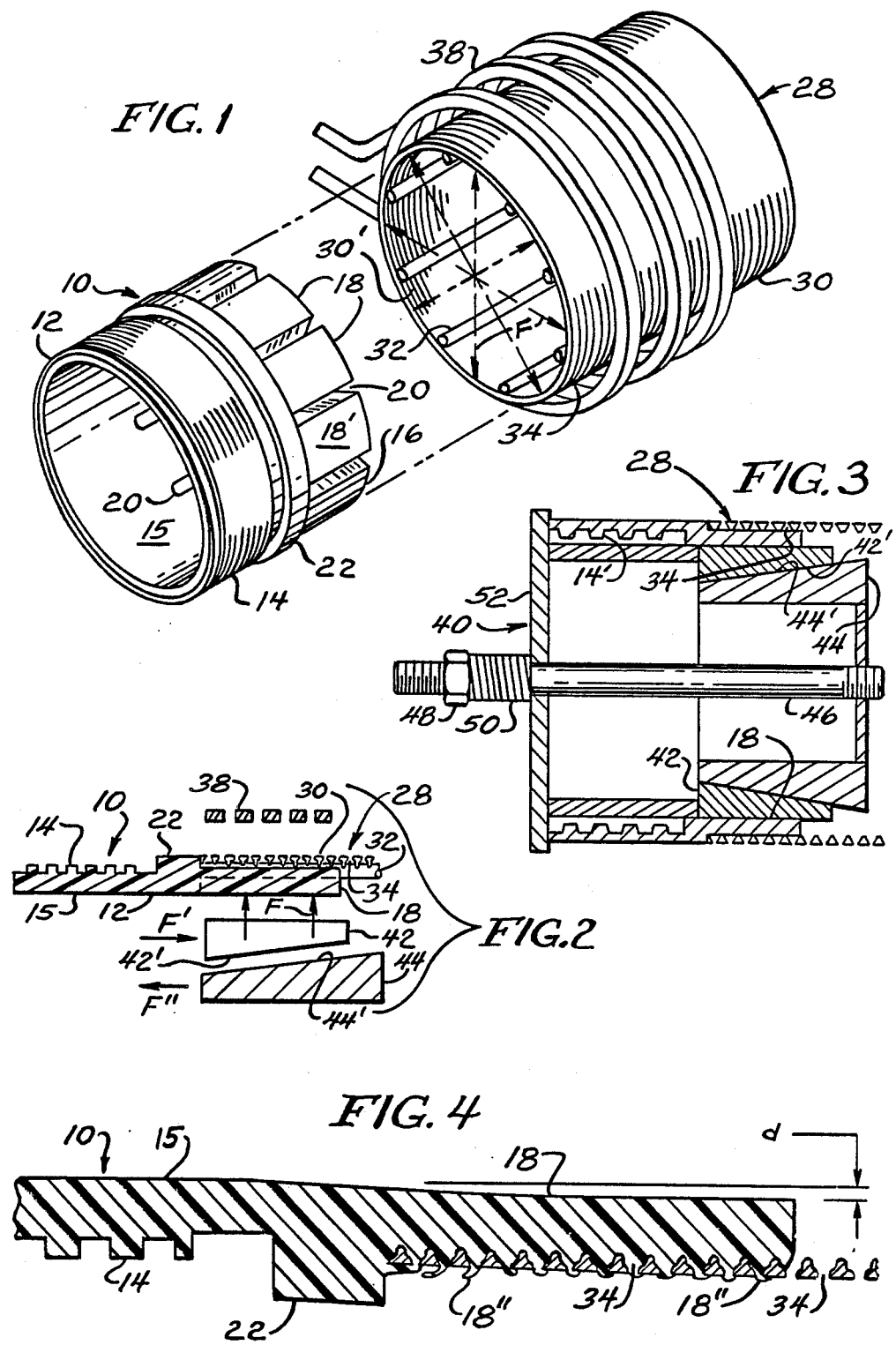

METAL WELL SCREEN ASSEMBLY WITH PLASTIC END FITTING AND METHOD OF ATTACHING SAME

BACKGROUND OF THE INVENTION

The invention relates to metal well screens and end fittings therefor. Well screens are typically made by wrapping a wire having a generally wedge or T-shaped cross-section around a series of longitudinal support rods to which the narrowest portion of the cross-section of the wire is welded or otherwise attached at every intersection to form inwardly opening flow slots. The wire and rods are generally made of metal, such as stainless steel, for its strength and corrosion resistance, but can also be formed of other materials, such as plastic. The end fittings are, when made of metal, usually threaded at their outer ends to permit a threaded pipe or another length of well screen to be attached thereto. Such fittings are usually welded to the ends of the support rods and often must also be welded around the periphery of the screen to the end wrap of wire. Since the fittings must also be resistant to corrosion, they are typically formed of stainless steel and are quite expensive. Also, the welding operation adds greatly to the expense of attaching such a fitting to a well screen. In view of the aforementioned cost and effort required to attach a stainless steel fitting to a metal well screen it would appear desirable to provide a less costly plastic fitting for such a screen if the same could be attached in a manner that would provide a sufficiently strong joint when later attached to another element such as a pipe or another length of well screen.

SUMMARY

It is among the objects of the present invention to provide a well screen assembly having a plastic end fitting and a method for mechanically attaching it to a metal well screen without the use of solvents and without the use of welds. It is another object to provide a corrosion resistant fitting for a metal well screen which is strong but yet low in cost and easy to assemble to the well screen. It is yet another object to provide a fitting having the aforementioned features which can be formed to allow the fitting to be joined to threaded metal pipe.

The foregoing and other objects are attained by the well screen assembly, fitting and method of the present invention in which a generally cylindrical plastic body member is formed, at its inner end which is attached to a well screen, with a plurality of spaced tongue or rib portions. The tongue or rib portions are dimensioned and spaced so that they will underlie a short axial portion of the inside surfaces of the screen wire portion of the well screen which is exposed between the support rods. Axial slots in the plastic body member between the tongue portions accommodate the longitudinal support rod portions of the well screen and prevent relative rotation between the fitting and well screen. The body member is preferably pre-formed into a generally cylindrical shape from a suitable thermoplastic material, such as polypropylene or polyethylene, which is readily softened and readily deformable. The preferred process of attaching a thermoplastic fitting to a well screen involves first telescoping the inner end of the pre-formed fitting into the end of the well screen. Although only the tongue portions must be heated, such heating is preferably accomplished by placing an induction heating element around the well screen and using the heat energy induced into the metal wires of the well screen to melt the outer surface portion of the tongue portions. Finally, pressure is applied internally on the tongue portions, such as by wedges, to force the heated tongues radially outwardly against the inside surface of the screen wires. The pressure will cause the tongues to become deformed so that alternating outer surface portions of them will be forced into the open slots of the screen and against the inner surface of the plurality of transverse wraps of screen wire which form them. The portions which enter the screen slots cause an interlocking action which, after cooling, prevents the fitting from being moved in either an axial or rotational manner relative to the well screen. However, since the elongated tongue portions can, by themselves, offer little resistance to radially applied forces, it is necessary to provide some type of retention means to maintain contact between the tongues and the screen slots when the screen assembly is subjected to loading during use. Preferably, this rentention is provided by causing the deformed portions of the tongues to extend slightly beyond the outer surface of the screen wires and also slightly sideways to provide somewhat of a mushroom-like cross-section which serves to prevent the tongues from pulling away from the wires. Alternative retention arrangements could also be used, such as an internal ring, for example.

In order to achieve a screen assembly which will have the inherent large flow capacity, strength and long life advantages of a wrapped metal screen and yet be competitive in price with plastic screens made from plastic pipe having slots cut in their cylindrical surface, it is preferable that a screen assembly produced in accordance with the present invention not only utilize novel plastic end fittings but also utilize a relatively small number of internal screen rods to which the screen wire is welded. For example, satisfactory results have been achieved by using just eight longitudinal internal support rods of 3.9 mm diameter in a screen having an outer diameter of 6.5 inches (16.5 cm), as compared to thirty two of the same diameter rods used in a typical wrapped wire metal screen. In one embodiment, the novel fitting has been provided at one end with eight "tongues" having a length of about 40 mm which are adapted to be positioned in the arcuate spaces between the eight rods of a complementary well screen section. The outer surface of the tongues lies in a cylindrical plane having a diameter which is preferably equal to or slightly less than the inner diameter of the wires which are wrapped around and welded to the support rods. The tonques are adapted to be melted sufficiently that a portion of their outer surface will be extruded through the slots in the metal screen when an outwardly directed radial force is applied to the inner surface of the tongues. It is quite desirable that the melting of the tongues only occurs at the interface of the screen and plastic. This selective melting appears to be most easily achieved by heating only the screen and using the heat transferred from the screen to the adjacently positioned thermoplastic tongue portions to melt the latter. It is preferred that the heating be accomplished electrically, either by resistance heating or by induction heating, although obviously other heating techniques, such as a gas flame burner, could be used. It is also desirable that the heating means be able to quickly bring the screen to a temperature of about 200° C.

Induction heating operates on the principal of inductance to induce eddy currents in metal which is surrounded by current carrying coils. These eddy currents circulate in a thin band at a depth inside the material which is known as the "penetration depth". The flow of eddy currents produces heat energy in the metal, about 90% of which is liberated at the penetration depth. This liberated heat will flow by conduction through the metal. In the case of a screen, this will be in two main directions: firstly to the outside surface from which it is removed by convection and secondly to the inside surface where it is conducted into the adjacent plastic tongues. The latter is the useful heat for the process which is used to melt the plastic. The relationship between the temperature of the screen and plastic tongues at various locations is quite important. For example, the temperature of the plastic at its interface with the screen should not exceed its degradation temperature. The degradation temperature is the temperature at which deleterious changes in the chemical structure of the plastic starts to take place. However, the tooling cannot begin to push the tongues into the screen slots until the entire thickness of the tongues is at its forming temperature. The forming temperature is the temperature at which a thermoplastic is stretchable but not molten. The process is not complete until the outer surface portion of the tongues has been melted sufficiently that the thickness of the tongues is reduced and the melted surface material has been forced into and through the screen slots. The material most suitable for the process should preferably have a high degradation temperature but a comparatively low melting temperature and a low forming temperature. It should also have a low latent heat of fusion which is the heat required to melt the plastic at constant temperature. Furthermore, it would be desirable for the material to have good thermal conductivity and a density that is not affected greatly by melting and then cooling. Two polypropylene materials that appear to be suitable are "Hydroline" pipe available from Hydroline, P. O. Box 18, Tamworth, Staffordshire, England, and a random copolymer sold under the name "Vespolen P6421" which is available from Bayer (Ireland) Ltd., Industrial Estate, Kill-O-Grange, County Dublin, Ireland. The former material requires a longer process time which can be considerably reduced by preheating it to the forming temperature of the plastic. The latter material would benefit little from being preheated since it has a relatively high thermal conductivity. The forming, melting and degradation temperatures, respectively, for the "Hydroline" material are approximately 40° C., 175° C. and 220° C. Similar temperatures for the "Vespolin P6421" material are 40°-60° C., 140°-150° C. and approximately 240° C.

One technique which has been used for forcing the melted plastic into and through the screen slots utilizes a tapered wedge tooling arrangement with a nut and bolt combined with a spring to apply the pulling force. For use with a fitting having eight tongues, the tool includes eight segments, one for each tongue, which are adapted to be pushed radially outwardly by the wedge arrangement as the nut is threaded onto the bolt. Obviously, other structural elements could be used to apply the necessary radial pressure, such as a pneumatic cylinder, for example.

Although an embodiment of a screen assembly having eight rods in the screen and eight tongues in the fitting has been described herein, it is possible to use a greater or lesser number. It would appear, however, that a screen assembly having a relatively few number of rods, such as eight, might even be stronger when made with the plastic fitting of the present invention than when made with a welded metal fitting. The reason for this is that the tensile strength of the screen rods is normally enhanced by work hardening during their manufacture. When they are welded to a metal fitting, they become partially annealed by the heat of the welding operation and thus lose part of their strength. Such annealing would not take place when using the disclosed fitting.

BRIEF DESCRIPTION OF THE DRAWINGS

FIG. 1 is an exploded isometric view illustrating the relationship of the plastic end fitting and metal screen before assembly;

FIG. 2 is an axial cross-section view illustrating the relationship of the plastic fitting and metal screen to an induction heating coil and a wedge mechanism for applying outward pressure to the fitting;

FIG. 3 is an axial cross-section view of a wedge mechanism which can be used to force melted tongue portions of the plastic fitting into the slots of the metal screen; and FIG. 4 is an axial cross-section view illustrating the plastic fitting and screen assembly after the plastic tongues of the fitting have been melted into the slots of the screen which overlie them.

DETAILED DESCRIPTION OF THE PREFERRED EMBODIMENT

Referring to FIG. 1, the novel plastic fitting indicated generally at 10 is shown in exploded relationship relative to a section of wire wrapped well screen indicated generally at 28 to which it is adapted to be mechanically attached. The fitting 10 includes an outer end portion 12 which is shown as having male threads 14 formed in the wall portion 15, but which could also have female threads, as indicated at 14' in FIG. 3. The threads permit the assembly to be attached to another element, such as a length of pipe or another section of well screen. Other means of fastening could also be employed. The opposite, or inner end portion 16 of the fitting includes a plurality of integral tongue portions 18 which are separated by slots 20. A shoulder portion 22 between the two ends of the fitting extends radially outwardly so as to provide a stop means which is adapted to be contacted by the outer end of the well screen 28 to limit its degree of telescopic movement relative to the fitting. The well screen 28 which is shown, is a conventional type which includes an outer wrap or screen wire 30 helically wrapped around and welded to a plurality of internal support rods 32 at every intersection therewith, so as to define a plurality of screen slots 34 between the wraps. An induction heating coil 38 is schematically indicated as surrounding the screen member 28 at the end thereof which is to overlie the plastic tongue portions 18 of the fitting 10. As previously discussed, the coil 38 may be energized to heat the end wraps 30' of the wrap wire 30 which underlie it. Thus, a source of heat is provided which may at least partially melt the outer surface 18' of the tongue portions 18 and permit portions of it to move radially outwardly into the slots 34 when outwardly directed radial pressure is applied in the direction of the arrows F.

FIG. 2 shows the fitting 10 in the position it assumes relative to the well screen member 28 just prior to the steps of heating the well screen and forcing the tongue portions 18 of the fitting radially outwardly against the well screen. A tool such as the tool 40 shown in FIG. 3, which includes a plurality of wedge members 42, one for each of the tongue portions 18, is preferably mounted interiorly of the fitting 10. The wedge members 42 are retained against axial movement by an end force F' while a conically shaped complementary wedge member 44 is moved by an opposing force F" in a direction to move the wedge members 42 radially outwardly as the wedge surfaces 42' and 44' slide over one another.

FIG. 3 illustrates a tool 40 which can be used to force the plastic tongue portions 18 radially outwardly against the screen member 28. The conical wedge member 44 is mounted so that it can be drawn by the threaded center rod member 46 so that its tapered surface 44' will contact the angled surfaces 42' on the wedge members 42 and drive the wedge members 42 radially outwardly against the plastic tongue portions 18. A nut 48 is tightened to compress a spring 50 mounted between the nut and end plate 52 and thereby exert the force of the spring to pull the rod 46 and conical wedge member 44 toward the end plate member. The compressed spring 50 tends to exert a uniform force on the conical wedge 44 in the direction F" (FIG. 2) which allows the plastic tongue portions 18 to be extruded into the slots 34 of the screen member 28 after they have been heated sufficiently to melt their outer surfaces.

FIG. 4 is a fragmentary cross-sectional view of the fitting 10 and screen 28 after the tongue portions 18 have been heated and melted sufficiently to allow portions of the outer surface 18' (FIG. 1) to enter the screen slots 34 and other portions 18" to pass through the screen slots and partially overlie the screen wires 30. Since the tongue portions 18 are deformed and partially melted as they are forced radially outwardly into the screen slots 34, it is obvious that the inner diameter of the tongue portions will increase relative to the inner diameter of the outer end wall portion 15, and the radial increase of this dimension is indicated at d.

I claim:

1. In a well screen assembly comprising a length of cylindrical metal well screen having a screen wire wrapped around and welded to a plurality of circumferentially spaced, longitudinal support rods to form screen slots and at least one end fitting integrally attached thereto, the improvement wherein said at least one end fitting is made of a plastic material, said plastic fitting being generally cylindrical and having an outer end portion with means thereon adapted to be engaged by complementary means on another member for attaching said well screen assembly to said other member, said fitting further having an inner end portion which comprises a plurality of axially extending and circumferentially arranged tongue portions, said tongue portions being located between said support rods so as to prevent rotation of said fitting relative to said well screen, each of said tongue portions also having an outer surface which contacts, along the axial length thereof, the inner surfaces of a plurality of transverse wraps of said screen wire and fills at least a portion of the depth of the screen slots defined by the side walls of said plurality of transverse wraps of screen wire.

2. The well screen assembly of claim 1 wherein said outer end portion is provided with internal threads.

3. The well screen assembly of claim 1 wherein said outer end portion is provided with external threads.

4. The well screen assembly of claim 1 wherein said fitting is made of a thermoplastic material.

5. The well screen assembly of claim 4 wherein said thermoplastic material is polypropylene.

6. The well screen assembly of claim 4 wherein said thermoplastic material is a random copolymer.

7. The well screen assembly of claim 1 wherein means are provided for retaining said tongue portions in contact with said screen wire and the side walls of said screen slots.

8. The well screen assembly of claim 7 wherein the means for retaining said tongue portions in contact with said screen wire and the side walls of said screen slots comprise portions of the outer surface of said tongue portions which fill at least a portion of the depth of the screen slots and extend radially outwardly of said screen slots sufficiently to partially overlie at least some of said plurality of transverse wraps of screen wire.

9. A plastic fitting adapted for use with a metal well screen assembly of the type which has a plurality of internal longitudinal support rods wrapped with wire to form closely spaced slots along the length thereof, said fitting being characterized in that it has a generally cylindrical inner end portion for attaching the fitting to said well screen and a generally cylindrical outer end portion provided with means for attaching the fitting to a pipe or other element, said inner end portion of said fitting having a plurality of longitudinal slots formed therein through at least the radially outermost region thereof, said plurality of longitudinal slots being adapted to receive the internal support rods of said metal well screen assembly when the fitting is telescopically pressed into the end of the well screen assembly to the depth of said inner end portion, the portions of said inner end portion which lie between said plurality of longitudinal slots being formed of a thermoplastic material which is softenable and deformable when subjected to heat and pressure whereby they can be forced radially outwardly against the wrap wire of said well screen assembly under heat and pressure so as to be extruded into the closely spaced slots of the well screen assembly.

10. A plastic fitting in accordance with claim 9 wherein said fitting includes a radially extending shoulder portion intermediate its inner and outer ends which serves to contact the outer end of a well screen and limit the degree to which it can telescopically overlie the inner end portion of the fitting.

11. A method of assembling a cylindrical plastic fitting member which has been formed of a thermoplastic material which is heat and pressure softenable and deformable, to a cylindrical metal well screen of the type which has a plurality of internal, circumferentially spaced, longitudinal support rods wrapped transversely with wire which is welded to said support rods to form closely spaced slots along the length thereof, said method comprising the steps of forming the inner end of the fitting so as to have a plurality of circumferentially spaced tongue portions which have an outer diameter which is no greater than the internal diameter of the wrapped wire portion of the well screen but which is greater than the internal diameter of the support rod portion; providing a plurality of longitudinal slots in at least the radially outermost region of the inner end portion which separate said spaced tongue portions from each other and which accommodate the internal longitudinal support rods of the well screen to which the fitting is to be attached; telescopically positioning the inner end of the fitting into the end of said well screen so that said longitudinal support rods are received within said longitudinal slots; applying sufficient heat to said spaced tongue portions of the inner end of said fitting which lie between said longitudinal slots to soften said tongue portions and cause at least some melting of its radially outermost surface; and, applying radially outward pressure to said spaced tongue portions sufficient to cause said tongue portions to be deformed and partially extruded radially outwardly into those closely spaced slots in said well screen which overlie said tongue portions.

12. A method in accordance with claim 11 wherein at least the heat which is necessary to cause some melting of the radially outermost surface of said tongue portions is applied to said spaced tongue portions indirectly by first heating the wrapped wire portion of the screen which overlies said tongue portions.

13. A method in accordance with claim 12 wherein said heat which is necessary to cause some melting of the radially outermost surface of said tongue portions is applied to said spaced tongue portions indirectly by positioning an induction heating coil around the wrapped wire portion of the screen which overlies said tongue portions and energizing said coil to heat said wrapped wire portion.

14. A method in accordance with claim 12 and including the additional step of preheating said tongue portions to a temperature less than their melting temperature before said fitting is positioned into the end of said well screen.

15. A method in accordance with claim 11 wherein sufficient radially outward pressure is applied to said spaced tongue portions to cause portions of them to be extruded through, and at least slightly beyond, said closely spaced slots so as to overlie portions of the wire that defines the slots.

* * * * *